United States Patent
Yoder et al.

(10) Patent No.: US 6,199,156 B1
(45) Date of Patent: Mar. 6, 2001

(54) SYSTEM FOR EXPLICITLY REFERENCING A REGISTER FOR ITS CURRENT CONTENT WHEN PERFORMING PROCESSOR CONTEXT SWITCH

(75) Inventors: Ronald W. Yoder, Mesa; Lowell McCulley; Russell W. Guenthner, both of Glendale, all of AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/212,842

(22) Filed: Dec. 16, 1998

(51) Int. Cl.[7] .................................................. G06F 12/02
(52) U.S. Cl. .................... 712/228; 712/225; 712/226; 712/229
(58) Field of Search ..................... 712/225–229

(56) References Cited

U.S. PATENT DOCUMENTS

| | | | |
|---|---|---|---|
| 5,016,164 | * 5/1991 | Srivastava | 712/228 |
| 5,386,563 | * 1/1995 | Thomas | 712/228 |
| 5,414,864 | * 5/1995 | Koizumi | 712/228 |
| 5,802,564 | * 9/1998 | Eickemeyer et al. | 711/123 |

OTHER PUBLICATIONS

Intel Architecutre Software Developer's Manual (IASDM), vol. 3, 1997.*
Linux Kernel Version 2.0 source code: arch/i386/kernel/traps.c.*
Bull HN Information Systems Inc. GCOS8 Operating System Programmers Guide, DPS9000G Assembly Instructions, Mar. 1998 Sec.9.1.8 CLIMB, pp. 9–12 to 9–43.

* cited by examiner

Primary Examiner—Meng-Al T. An
Assistant Examiner—Wen-Tai Lin
(74) Attorney, Agent, or Firm—B. E. Hayden; J. S. Solakian

(57) ABSTRACT

In a data processing system that includes a safe store buffer containing valid copies of all registers, processor transitions from a higher security routine to a lower security routine can be performed in fewer cycles by loading the safe store buffer from a safe store stack frame, then delaying loading registers either until actually utilized, or by a background process that loads registers utilizing unused memory cycles. A flag is used for each register that indicates whether the register contents are valid. This flag is cleared for each of the registers whenever such a state transition is made. Then, the flag is set for a register when it is referenced and made valid.

20 Claims, 9 Drawing Sheets

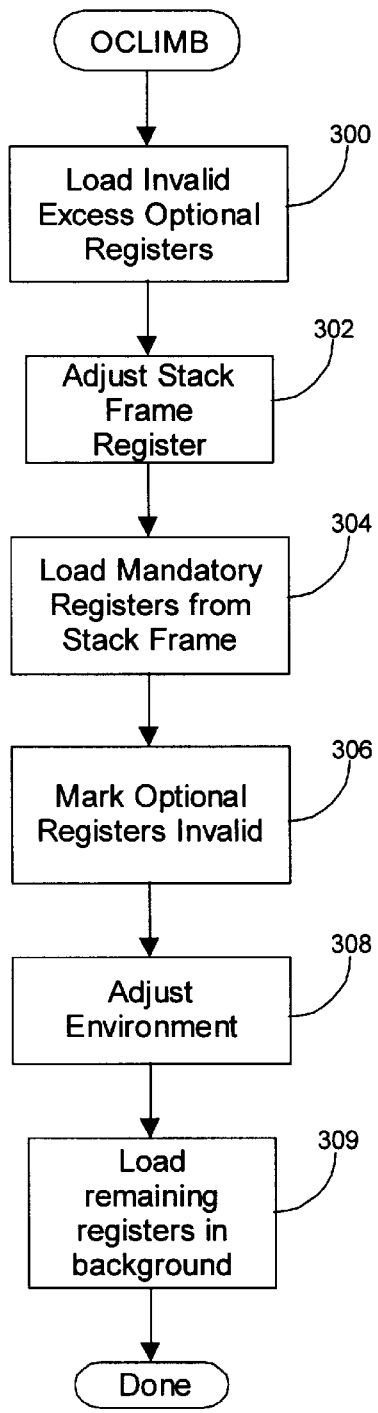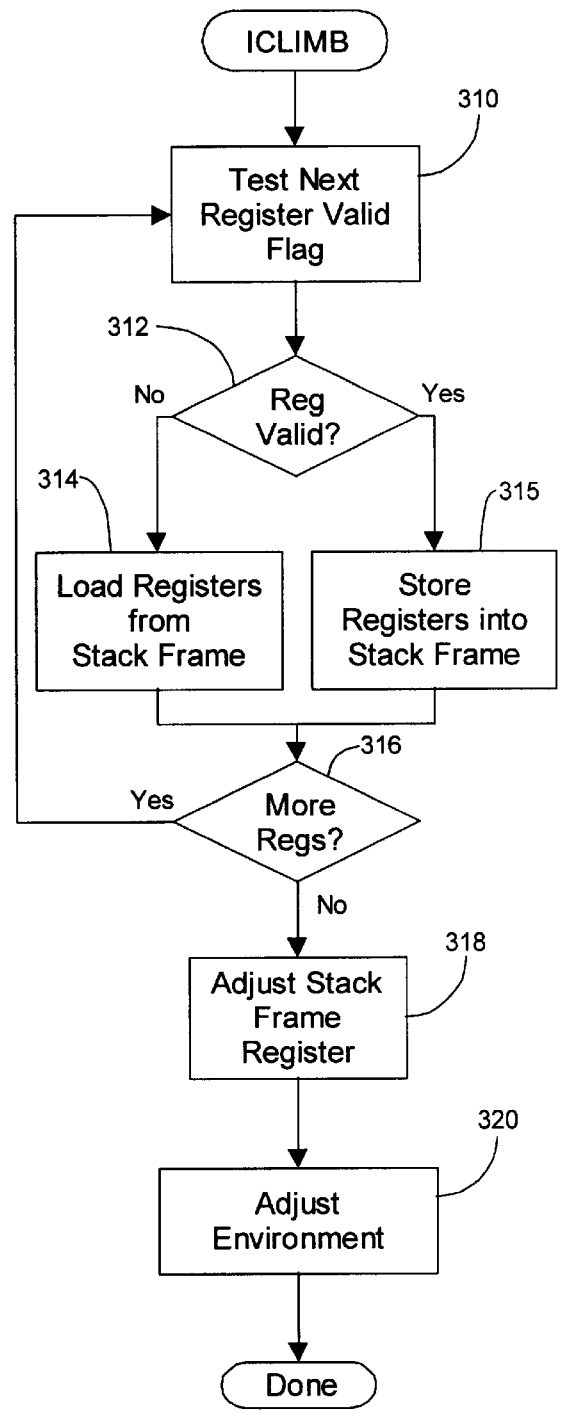
FIG. 12
FIG. 11

SYSTEM FOR EXPLICITLY REFERENCING A REGISTER FOR ITS CURRENT CONTENT WHEN PERFORMING PROCESSOR CONTEXT SWITCH

FIELD OF THE INVENTION

The present invention generally relates to data processing systems, and more specifically to delaying register reload from a register save buffer until needed.

BACKGROUND OF THE INVENTION

Computer processors typically include in their instruction sets instructions for changing processor state. For example, many computer architectures include instructions to change from user mode to supervisory mode, and back. Indeed, without this sort of instruction, it is highly problematic whether architecture can do an adequate job in protecting one user from another, or the operating system from users.

In a modern operating system (OS), there are well-defined tasks that must be accomplished when an operating system dispatches user tasks and programs to execute, and when the operating system receives control back after such execution. Some of these tasks including loading and storing general-purpose registers and segment registers.

Some architectures, especially Reduced Instruction Set Computer (RISC) architectures, utilize long, often repeated, sequences of code to load and store these general purpose and segment registers. As this function is repeated whenever control is transferred to or received from a user program, this approach of utilizing long, often repeated, sequences of code can be quite costly. For that reason, specialized instructions have been added to some architectures to expedite this entire process. For example, the GCOS® 8 architecture, owned by the assignee of this invention, includes a CLIMB instruction utilized to change from supervisory mode to user mode, and back. The CLIMB family of instructions performs all actions necessary to change from supervisory mode to user mode, and back in a single instruction.

Unfortunately, execution of such complex state changing instructions as the CLIMB can be quite expensive in terms of processor cycles required for execution. This is especially important in high volume transaction environments where it is necessary to switch back and forth, to and from supervisory mode to user mode quite often. It would thus be extremely useful if the number of computer cycles could be reduced when executing a complex state change instruction.

One place where a significant amount of time is spent during execution of complex state change instructions is in loading and restoring all of the registers required. This is typically done in a serial fashion, loading or storing one register at a time. This can be quite expensive in terms of processor cycles. It would thus be advantageous for a computer architecture to provide a mechanism for eliminating at least some register loading and/or storing.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 11 is a flowchart illustrating operation of an ICLIMB instruction, in accordance with an alternate embodiment of the present invention;

FIG. 12 is a flowchart illustrating operation of an OCLIMB instruction, in accordance with an alternate embodiment of the present invention;

DETAILED DESCRIPTION

Figure 1:
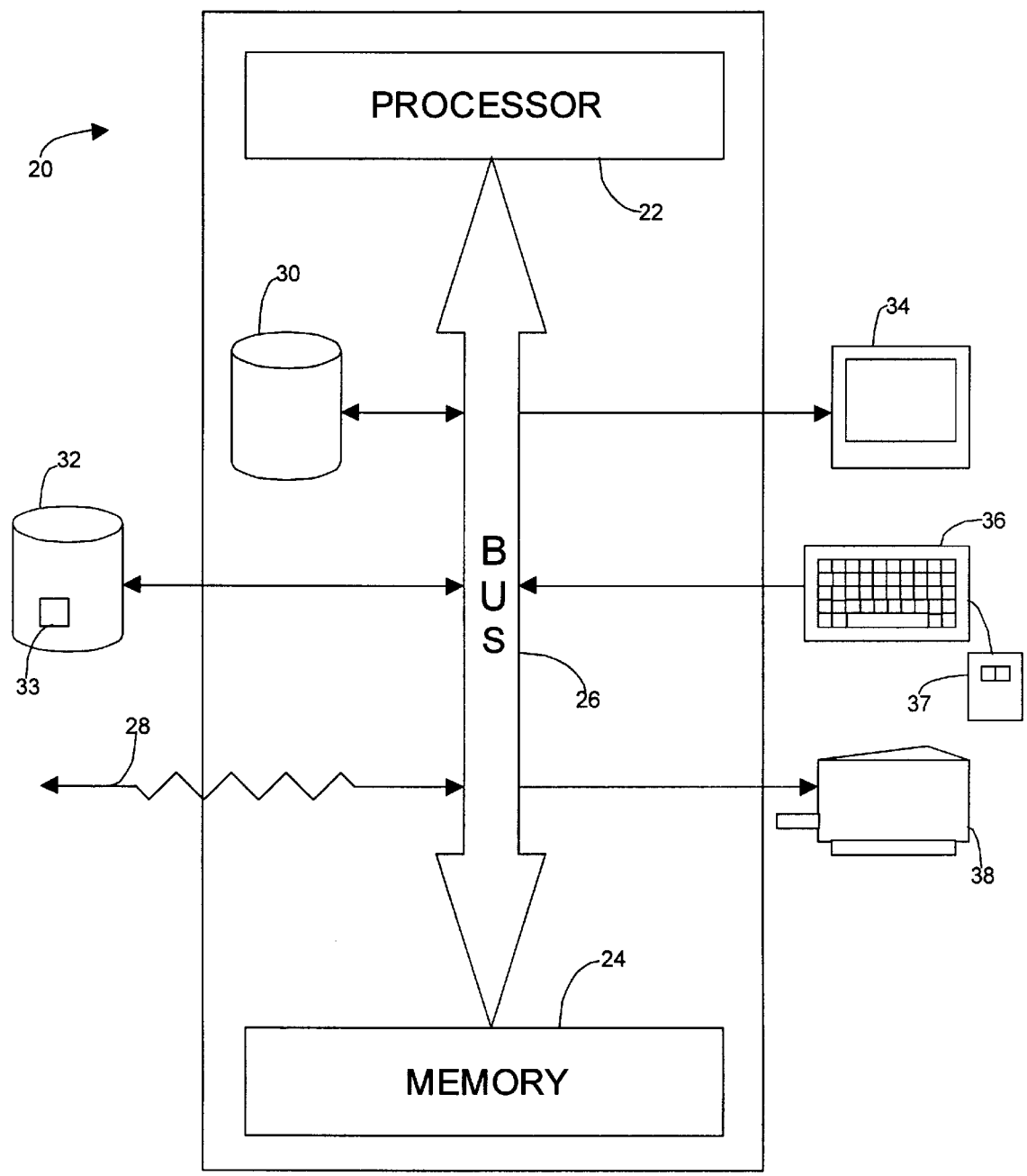
FIG. 1 is a block diagram illustrating a General Purpose Computer, in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The GCOS® 8 operating system supports a CLIMB family of instructions to change the programming environment. The ICLIMB instruction is utilized to transfer control from a less secure environment, such as a user program, to a more secure environment, such as the operating system. The OCLIMB instruction operates in reverse, transferring control back to the less secure environment. Interrupts are typically serviced by a variant of the ICLIMB instruction.

The ICLIMB instruction first adjusts a Safe Store Stack Register (SSR) to point at a new Safe Store Stack Frame 298. The instruction then saves part or all of the current programming environment from a Safe Store Buffer 286 into that Safe Store Stack frame 298. In the preferred embodiment, a Safe Store Stack Frame 298 may be 16, 24, 64, or 80 words in length. The Safe Store Stack Frame 298 is then pushed out to memory.

When the higher security environment returns, an OCLIMB is executed in order to restore the previous environment. In the prior art, execution of this instruction both the Safe Store Buffer 286 and the corresponding registers are loaded from the current Safe Store Stack Frame 298. The Safe Store Stack Register (SSR) is adjusted to address the previous Safe Store Stack Frame 298, and control is transferred to the return address.

Registers can be divided into "required" and "optional" registers. The required registers are always modified by program execution. For example, one such "required" register is the Instruction Counter (IC) which is incremented for each sequential instruction executed. The remainder of the registers, which may or may not be modified or read by execution of code, are "optional" register. Note that the distinction between "required" and "optional" registers is somewhat arbitrary, and preferably registers are place in one class or another based on performance testing to optimize performance.

The present invention minimizes the process of saving and restoring registers from/to a Safe Store Stack Frame 298 by delaying the loading of optional registers from the Safe Store Stack Frame 298 until any given register is read. When an ICLIMB instruction is executed, certain registers are modified. The register modifications are made to the Safe Store Buffer 286. Modified required registers are then loaded, either from the Safe Store Buffer 286, or directly, and are marked valid. Modified optional registers are marked invalid and are only loaded from the Safe Store Buffer 286 when read. When an OCLIMB instruction is executed, a Safe Store Stack Frame 298 is read into the Safe Store Buffer 286. Required registers that are to be restored are loaded from the Safe Store Buffer 286 and marked valid. Optional registers that are to be restored are marked as invalid. In the case of either the ICLIMB or the OCLIMB, if a register is modified before being read (i.e. while still marked invalid), or if the register is not read before execution of the next OCLIMB instruction, the loading of that register may be suppressed. The result of these optimizations is that the optional registers are only loaded when needed. This can save significant processor cycles.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such test programs, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
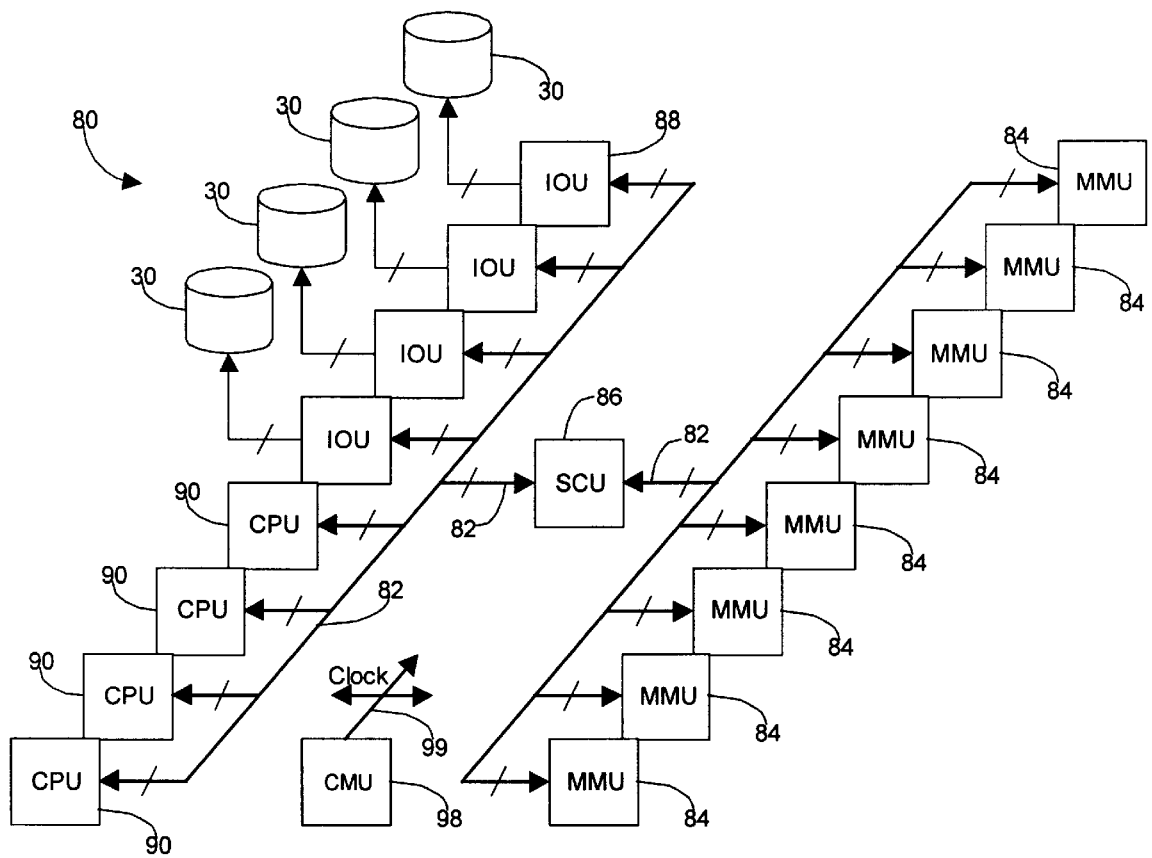
FIG. 2 is a block diagram of a more detailed view of a multiprocessor data processing system, in accordance with a preferred embodiment of the present invention.

FIG. 2 is a block diagram of a more detailed view of a multiprocessor data processing system, in accordance with the present invention. The multiprocessor data processing system 80 comprises a plurality of modules coupled together via an intramodule bus 82 controlled by a storage control unit 86. In the preferred embodiment, each such module 84, 88, 90 is contained on a single board, with the boards connecting into a backplane. The backplane includes the intramodule bus 82. In the representative data processing system 80 shown in FIG. 2, sixteen modules are shown. The system includes four (4) processor ("CPU") modules 90, four (4) Input/Output ("IOU") modules 88, and eight (8) memory ("MMU") modules 84. Each of the four Input/Output ("IOU") modules 88 is shown coupled to secondary storage 30. This is representative of the function of such IOU modules 88. Each IOU module 88 will typically contain a plurality of IOU processors (not shown). Each of the eight memory modules 84 contains memory 24 and a memory controller (not shown). This memory 24 is typically Dynamic Random Access Memory (DRAM). Large quantities of such memory 24 are typically supported. Also shown in FIG. 2 is a Clock Management Unit 98, which supplies a standard clock signal 99 to the remainder of the system 80. As clock signals are ubiquitous in digital computer architectures, the clock signal 99 will not be shown further herein except where relevant.

Figure 3:
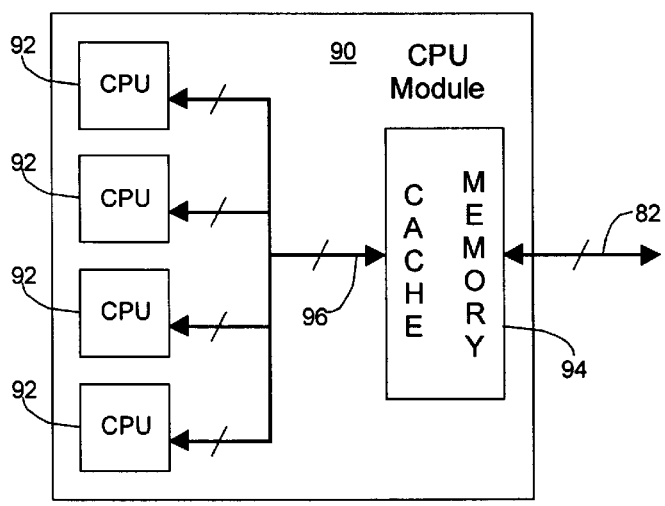
FIG. 3 is a block diagram illustrating a processor (CPU) module as shown in FIG. 2.

FIG. 3 is a block diagram illustrating a processor (CPU) module 90 as shown in FIG. 2. The CPU module 90 contains a plurality of processors (CPU) 92 and a cache memory system 94. In the preferred embodiment, each processor (CPU) module 90 contains up to four (4) processors (CPU) 92. The processors 92 and the cache memory system 94 are coupled together and communicate over an intraprocessor bus 96.

The cache memory system 94 is shared among the processors 92 on the CPU module 90 and maintains cache copies of data loaded into those processors 92. The cache memory system 94 is considered here a Level 2 cache and is coupled to and communicates with the storage control system (SCU) 88 over the intramodule bus 82 in order to maintain cache coherency between Level 1 cache memories 94 on each of the processor modules 90, as well as between cache memories 54, 56 in each of the processors 92, and on the IOU modules 88. The SCU 88 also maintains coherency between the various cache memories 94, 54, 56, and the typically slower speed memory in the MMU modules 84. In the preferred embodiment, a single block of memory will be owned by a single cache or memory at potentially each level in the memory hierarchy. Thus, a given memory block may be owned by one Level 1 cache 54, 56, by one Level 2 cache 94, and by one MMU 84.

Figure 4:
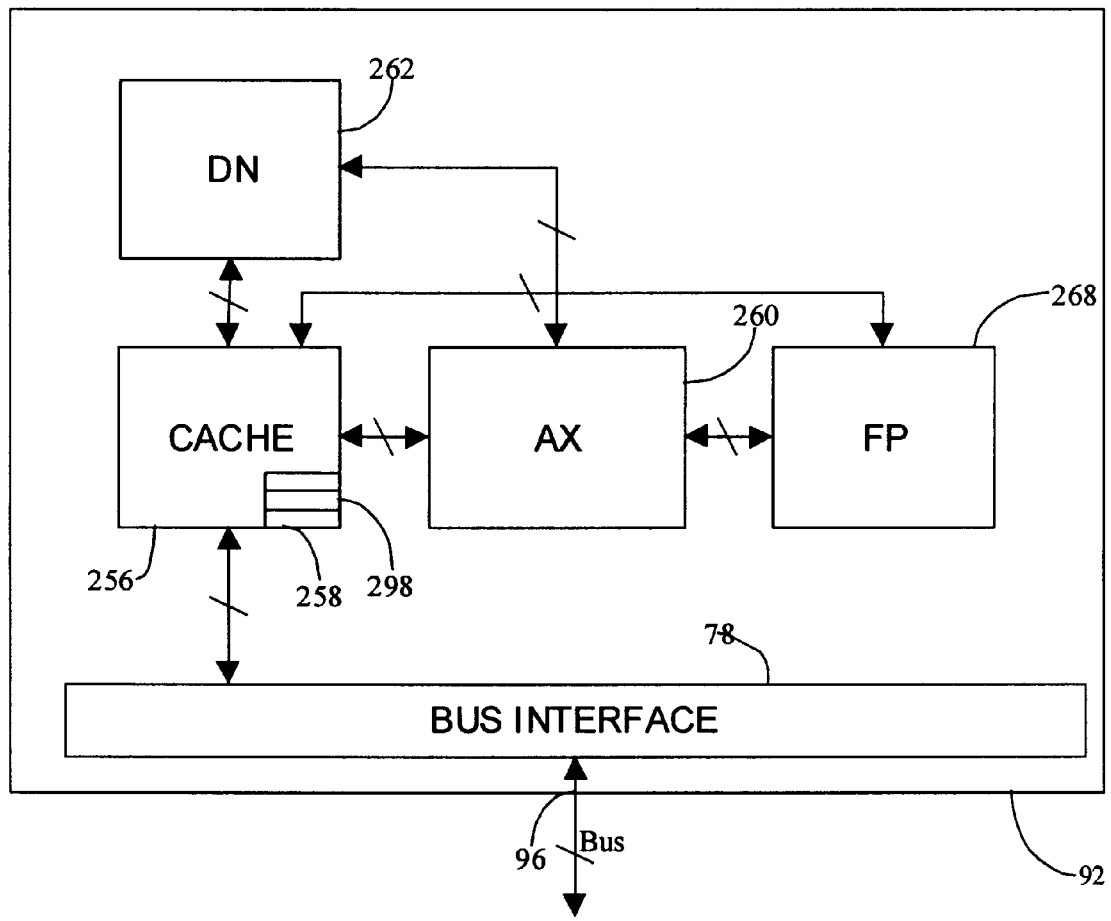
FIG. 4 is a block diagram of a processor shown in FIG. 3.

FIG. 4 is a block diagram of a processor 92 shown in FIG. 3. The processor 92 communicates with the bus 96 utilizing a bus interface 78. The bus interface is bidirectionally coupled to a unified local cache 256. Cache memories, such as this unified local cache 256, are typically constructed as high speed Static Random Access Memories (SRAM). In the preferred embodiment, the local cache 256 is incorporated on the same integrated circuit as the remainder of the processor 92. The local cache 256 is the primary block that interfaces with the bus interface 78. Data and instructions are loaded via the bus 96 into the local cache 256, and data is written back from the local cache 256 via the bus 96. Within the local cache 256 is shown a Safe Store Stack 258. Note that each program executing in a multi-programming environment has its own Safe Store Stack 258.

Figure 10:
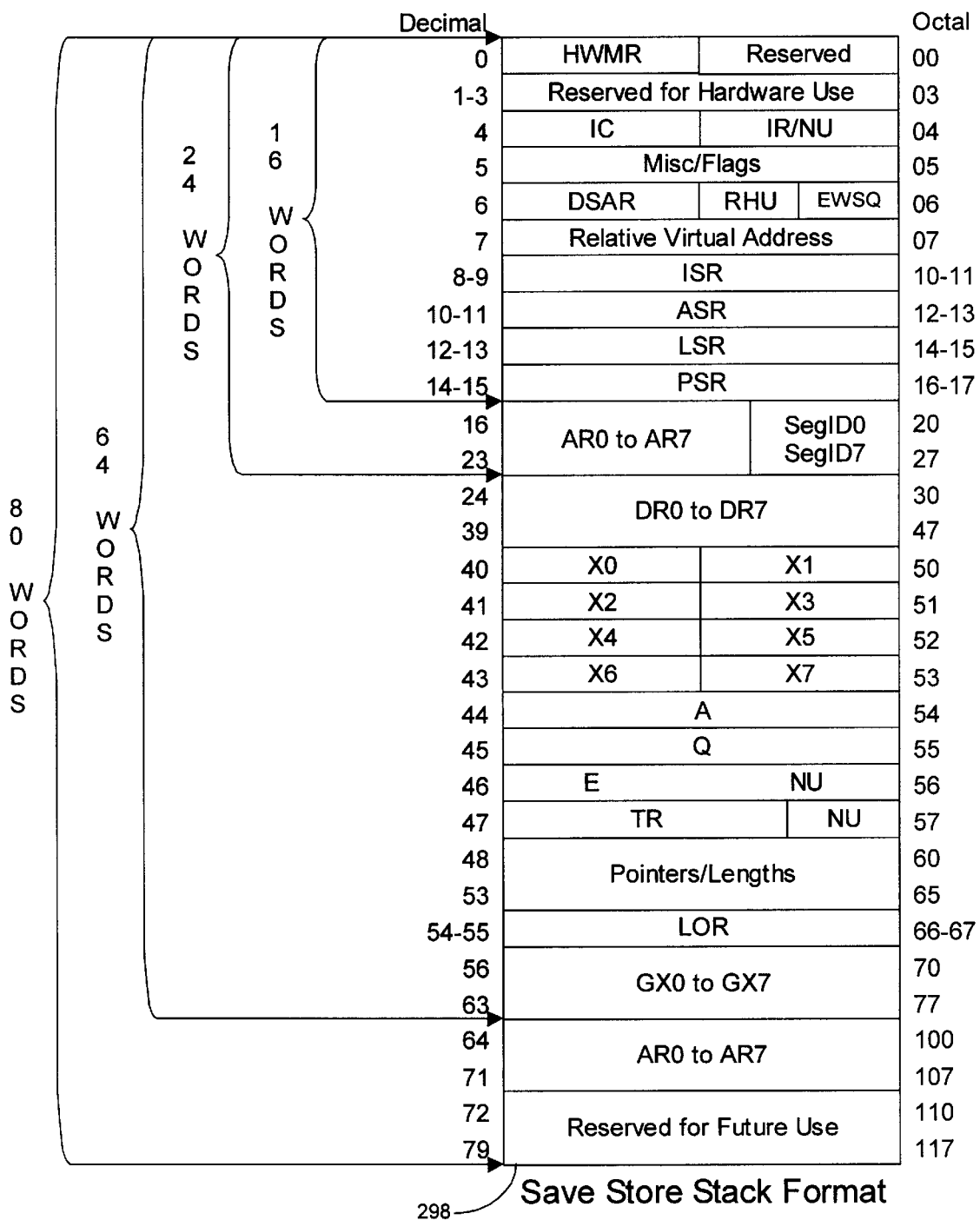
FIG. 10 is a diagram illustrating a Safe Store Buffer (SSB), in accordance with a preferred embodiment of the present invention.

The safe store stack (SSS) 258 typically contains a number of Safe Store Stack Frames 298. It should be noted that though the Safe Store Stack 258 is shown located in the local cache 256, typically less recently used portions of the Safe Store Stack 258 that include less recently used Safe Store Stack Frames 298 are pushed out to either the L2 shared cache 94, or to slower memory 84 to make room for more current data in the local (L1) cache 256. The Safe Store Stack Frames 298 contain environmental data, such as register contents, necessary to restore previous processor contexts. The layout of Safe Store Stack Frames 298 in the preferred embodiment is shown in FIG. 10. The Safe Store Stack Frames 298 are stacked in the Safe Store Stack 258 as programs transition to ever more privileged contexts, and unstacked as the programs return from the more privileged contexts to less privileged contexts.

The local cache 256 is bidirectionally coupled to an AX module 260. The AX unit 260 provides the bulk of the functionality of the processor 92, including instruction decode. The AX unit 260 is bidirectionally coupled to and controls execution of a floating point (FP) unit 268 and a decimal/numeric (DN) unit 262. In the preferred embodiment, the floating-point unit 268 performs both floating-point operations, and fixed-point multiplications and divisions. It is bidirectionally coupled to the local cache 256. The decimal/numeric (DN) unit 262 performs decimal and string operations. It is bidirectionally coupled to the local cache 256, allowing it to operate relatively autonomously from the AX unit 260. Rather, once decimal or string operations are initiated in the DN unit 262, the DN unit 262 is driven by operand availability in the local cache 256.

Figure 5:
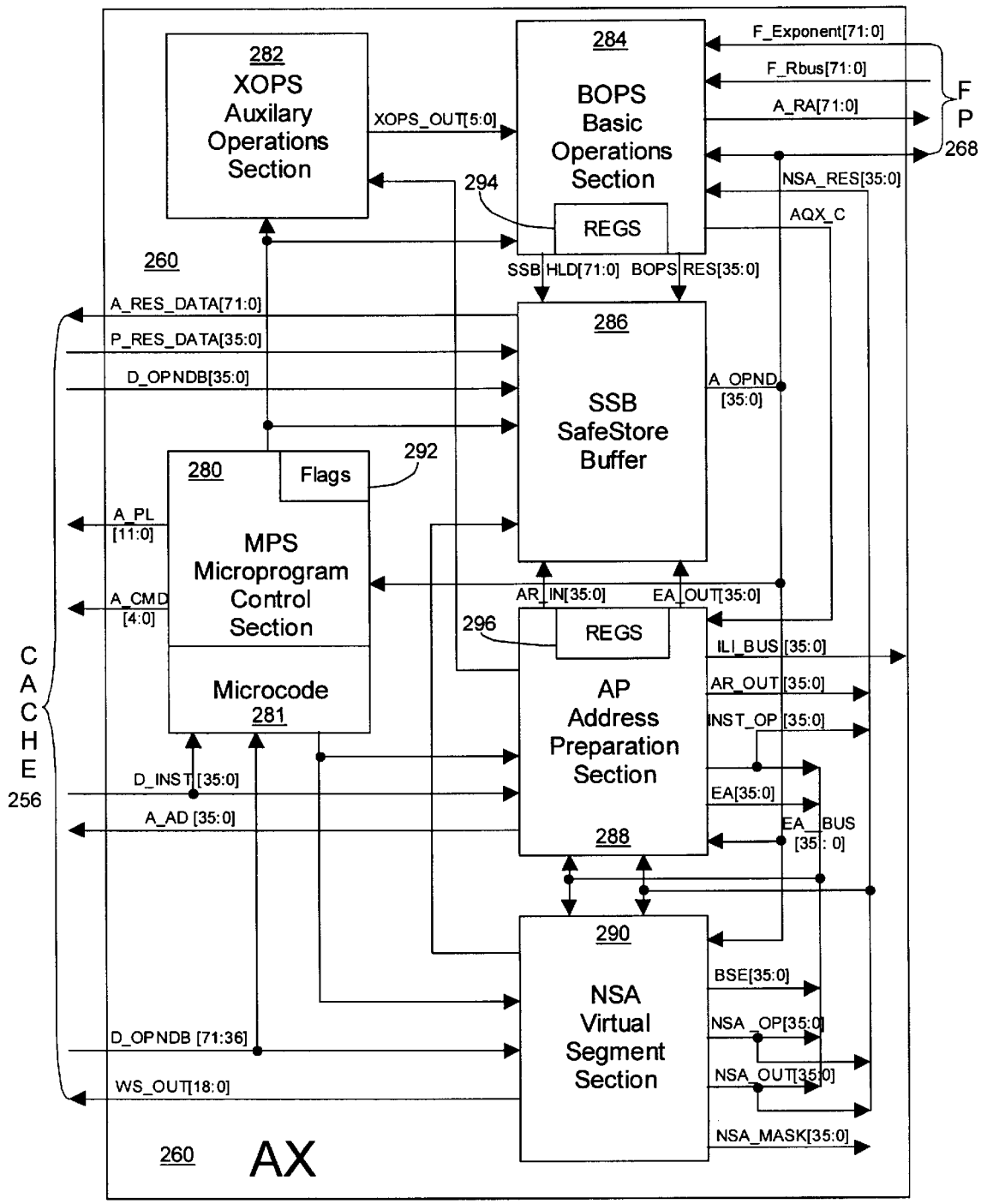
FIG. 5 is a block diagram illustrating an AX unit in the processor shown in FIG. 4.

FIG. 5 is a block diagram of an AX unit 260 in the processor 92 shown in FIG. 4. The AX unit 260 comprises a Microprogram Control Section (MPS) unit 280, an Auxiliary Operations Section (XOPS) 282, a Basic Operations Section (BOPS) 284, a Safe Store Buffer (SSB) 286, an Address Preparation (AP) section 288, and a NSA Virtual Segment Section 290. The MPS 280 is bidirectionally coupled to and receives instructions from the local cache 256. The MPS 280 performs instruction decode and provides microprogram control of the processor 92. The microprogram control utilizes a microengine executing microcode 281 stored in both dynamic and static memories in response to the execution of program instructions. The MPS 280 is bidirectionally coupled to and controls operation of the Auxiliary Operations Section (XOPS) 282, the Basic Operations Section (BOPS) 284, the floating point (FP) unit 268, the decimal/numeric (DN) unit 262, the Address Preparation (AP) section 288, and the NSA Virtual Segment Section 290. The Basic Operations Section (BOPS) 284 is used to perform fixed point arithmetic, logical, and shift operations. The Auxiliary Operations Section (XOPS) 282 performs most other operations. The Address Preparation (AP) section 288 forms effective memory addresses utilizing virtual memory address translations. The NSA Virtual Segment Section 290 is bidirectionally coupled to and operates in conjunction with the AP section 288, in order to detect addressing violations.

The Safe Store Buffer (SSB) 286 maintains the current status of the processor 92 environment, including user and segment registers. One purpose of the SSB 286 is to expedite changing processor state. Safe Store Stack Frames 298 containing context information, including register contents, are pushed from the Safe Store Buffer (SSB) 286 into memory when making context switches to higher privileged environments. The Safe Store Buffer (SSB) 286 is reloaded from Safe Store Stack Frames 298 stored in memory when making context switches back to lower privileged environments. Such context switches can be done under program control, or in response to internal or external interrupts. The SSB 286 is coupled to and receives signals from the BOPS 284, the AP section 288, the MPS 280, and the NSA 290. The SSB 286 receives register update information from these elements 280, 284, 288, 290, allowing the SSB 286 to maintain an accurate copy of all registers in the processor 92, and provides current register contents back to these elements 280, 284, 288, 290, upon demand. In the preferred embodiment, register update information is registered in the SSB 286 one half cycle after being registered in these other elements 280, 284, 288, 290. The SSB 286 is bidirectionally coupled to the local (L1) cache 256, allowing Safe Store Stack Frames 298 to be pushed out to L1 cache 256 when entering a new processor environment, and pulled back from L1 cache 256 when returning to an old processor environment.

The Basic Operations Section (BOPS) 284 contains arithmetic and logical registers 294. The Address Preparation (AP) section 288 contains address translation registers 296. These address translation registers 296 are also utilized by the NSA Virtual Segment Section 290. Corresponding to each of the optional registers is a register valid flag 292, residing in the Microprogram Control Section 280, where the register valid flag 292 can be utilized by microcode 281 to determine whether the register, or the current Safe Store Stack Frame 298 in the Safe Store Buffer (SSB) 286, contains the valid value for the corresponding register.

Figure 6:
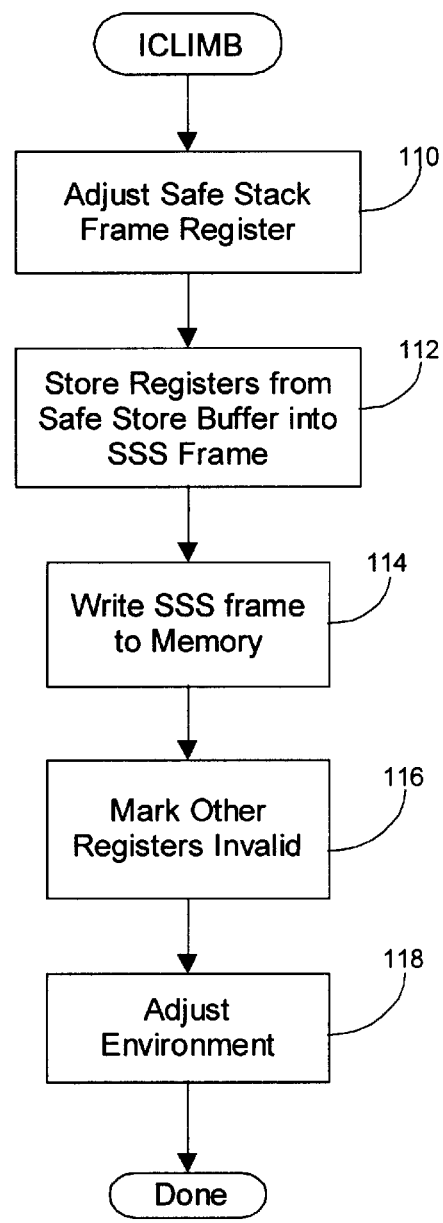
FIG. 6 is a flowchart illustrating operation of an ICLIMB instruction, in accordance with a preferred embodiment of the present invention.

FIG. 6 is a flowchart illustrating operation of an ICLIMB instruction, in accordance with a preferred embodiment of the present invention. The ICLIMB instruction is typically utilized to transfer control from a lower security environment, such as a user program, to a higher security environment, such as the operating system. This is the method typically utilized to request system services. Interrupts are serviced by a special variant of the ICLIMB instruction. As noted below, the OCLIMB instruction is typically utilized to return from the ICLIMB instruction or from system interrupts. In the preferred embodiment, the ICLIMB instruction will selectively lay down a SSB stack frame 298 of 16, 24, 64, or 80 words. The format of a SSB frame 298 is shown in FIG. 10.

The ICLIMB instruction starts by adjusting a Safe Store Register (SSR) to address a new Safe Store Stack Frame 298, step 110. The Safe Store Buffer 286 version of registers are written into the new Safe Store Stack (SSS) frame 298, step 112. The Safe Store Stack frame 298 is then pushed out to memory 24. The Safe Store Stack frame 298 will typically be written initially to local (L1) cache 256, but may later be pushed to shared (L2) cache 94 or shared memory 84, step 114, before being reloaded by a corresponding OCLIMB instruction. The ICLIMB instruction causes certain environmental registers to be modified. Any low-use or optional environmental registers that need to be modified are marked invalid, by clearing a valid flag 292 for each such register, while all the required-use environmental registers that need to be modified are loaded, step 116. Finally, the remainder of the environment is appropriately modified and control is transferred to the designated location in the new environment, step 118.

Figure 7:
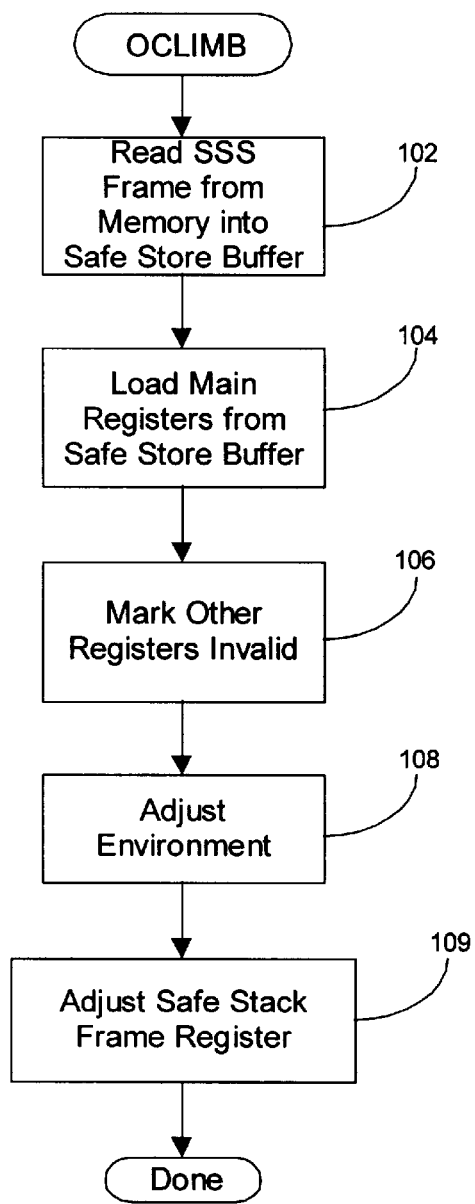
FIG. 7 is a flowchart illustrating operation of an OCLIMB instruction, in accordance with a preferred embodiment of the present invention.

FIG. 7 is a flowchart illustrating operation of an OCLIMB instruction, in accordance with a preferred embodiment of the present invention. The OCLIMB instruction is utilized to transfer control from a higher security or more privileged environment, such as the operating system, to a lower security or lesser privileged environment, such as a user program. It is primarily utilized to return from a previous call to ICLIMB (see FIG. 7) or from servicing interrupts. One of its primary purposes is to restore registers to the state they were in before the corresponding ICLIMB instruction was executed.

The OCLIMB starts by reading a SSS frame 298 from memory into the Safe Store Buffer (SSB) 286, step 102. In the preferred embodiment, the memory is the internal (L1) cache 256. However, it may be necessary to load the Safe Store Stack Frame (SSSF) 298 from either the shared (L2) cache 94, or even a Memory Management Unit (MMU) 84. It should be noted that loading the SSB 286 from a SSSF 298 can be done efficiently, with much of the loading progressing in parallel with other operations performed by the OCLIMB instruction. Note also that reads of a Safe Store Stack Frame 298 from memory and writes of such to memory can be performed over a wide data path. In the preferred embodiment, these reads and writes are performed utilizing an eight (8) word data path.

After the SSS Frame 298 has been loaded from memory, step 102, "mandatory" registers are automatically loaded from the SSS frame 298, step 104. These are registers that are always accessed. For example, the Instruction Counter (IC) register is loaded with the address at which execution will continue after the OCLIMB is complete, and will increment or be modified for each instruction subsequently executed. Similarly, certain segment or page base and limit registers are required to define a program environment for minimal execution of any program. The other, "optional", registers, may, or may not be modified or read during program execution. Loading of these "optional" registers is delayed until referenced (see FIG. 9). Instead, a valid flag 292 is cleared for each optional register, step 106. Then, the system environment is adjusted as required, step 108, the Safe Store Stack register is adjusted to address the previous Safe Store Stack Frame 298, step 109, and the instruction terminates by transferring to the address loaded in the Instruction Counter (IC) register.

Figure 8:
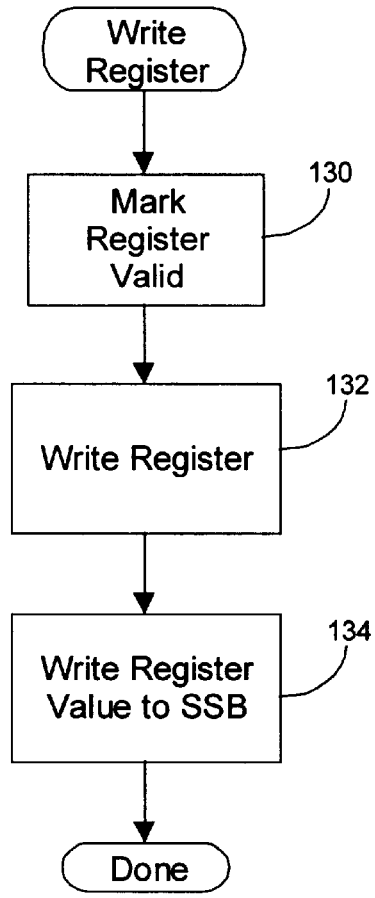
FIG. 8 is a flowchart illustrating writing a register, in accordance with a preferred embodiment of the present invention.

FIG. 8 is a flowchart illustrating writing a register, in accordance with a preferred embodiment of the present invention. This happens whenever a register is updated, whether as a result of some operation, or as a result of loading a value from memory into the register. In any case, if the register is an optional register, the corresponding register valid flag 292 is set, step 130, indicating that the register contains a valid value. The register is written or updated, step 132. The contents of the register are then sent to the Safe Store Buffer 286, step 134, where in the preferred embodiment, the contents are registered one half cycle later, and the operation is complete. It should be understood that though steps 130 and 132 are shown in sequential order for the preferred embodiment, in an alternate embodiment, they may be executed in parallel by the microcode engine 280. Different techniques may be utilized to update the SSB 286. One such method is to utilize register bus snooping.

Figure 9:
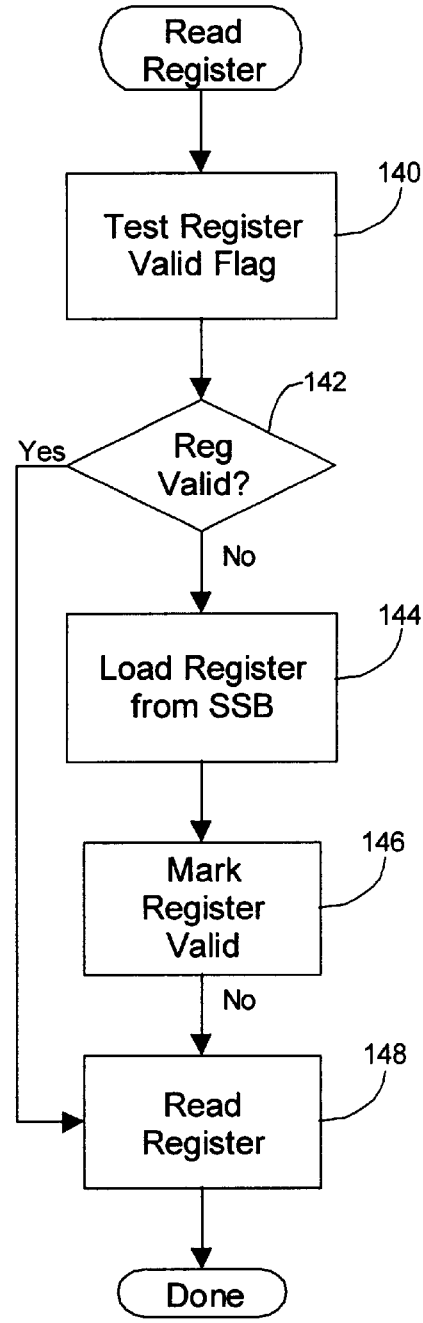
FIG. 9 is a flowchart illustrating reading a register, in accordance with a preferred embodiment of the present invention.

FIG. 9 is a flowchart illustrating reading a register, in accordance with a preferred embodiment of the present invention. In the case of optional registers, the corresponding register valid flag 292 is tested, step 140. If the register valid flag 292 is set, the register contains a valid value. Otherwise, if the register valid flag 292 is not set, step 142, the register is not valid. Rather, the valid contents of the register are to be found in the Safe Store Buffer (SSB) 286, from which the register is loaded, step 144, and the register valid flag 292 is set, step 146. In any case, the register is then read, step 148, and the register value is made available.

The vast majority of registers in a typical computer system will be "optional" registers. In the preferred embodiment of the current invention, these registers are not reloaded directly from a Safe Store Stack Frame (SSSF) 298. Rather, they are loaded into the Safe Store Buffer (SSB) 286, and from there loaded as needed into the actual registers. This saves the cycles needed to load the registers from the Safe Store stack frame 298 if the registers are never read, or are written before being read.

FIG. 10 is a diagram illustrating the format of a Safe Store Stack (SSS) Frame 298, in accordance with a preferred embodiment of the present invention. As noted above, the ICLIMB instruction selectively lays down either a 16, 24, 64, or 80 word SSS stack frame 298. Table T-1 contains the register names and mnemonics for the registers supported by a GCOS® 8 processor. The first column ("Register Name") contains the name of the register. The second column ("ID") contains a register ID or mnemonic. The third column ("Size") contains the size of the register in bits. The fourth column ("#") contains the number of that type of register. The fifth and sixth columns ("SSSF") contains the starting and ending decimal offsets for the register in the Safe Store Stack Frame 298 shown in FIG. 10. The registers marked with "*" in these columns indicate registers not saved in the SSSF 298.

TABLE T-1

Processor Accessible Registers

| Register Name | ID | Size | # | SSSF | |
|---|---|---|---|---|---|
| Data Stack Descriptor Registers | DSDR | 72 | 1 | * | * |
| Option Register | OR | 3 | 1 | * | * |
| Page Directory Base Register | PDBR | 19 | 1 | * | * |
| Pointer Registers | PRn | 108 | 8 | * | * |
| Safe Store Stack Register | SSR | 72 | 1 | * | * |
| High Water Mark Register | HWMR | 18 | 1 | 0 | 0 |
| Interrupt Mask Register | IMR | 36 | 1 | 0 | 0 |
| Fault Register | FR | 72 | 1 | 1 | 3 |
| Instruction Counter | IC | 18/34 | 1 | 4 | 4 |
| Indicator Register | IR | 18 | 1 | 4 | 4 |
| Stack Control Register | SCR | 2 | 1 | 5 | 5 |
| Instruction Segment Identity | SEGID | 12 | 1 | 5 | 5 |
| Data Stack Address Register | DSAR | 17 | 1 | 6 | 6 |
| Instruction Segment Register | ISR | 72 | 1 | 8 | 9 |
| Argument Stack Register | ASR | 72 | 1 | 10 | 11 |
| Linkage Segment Register | LSR | 72 | 1 | 12 | 13 |
| Parameter Segment Register | PSR | 72 | 1 | 14 | 15 |
| Segment Descriptor Registers | SEGIDn | 12 | 8 | 16 | 23 |
| Segment Descriptor Registers | DRn | 72 | 8 | 24 | 39 |
| Index Registers | Xn | 18 | 8 | 40 | 43 |
| Accumulator Register | A | 36 | 1 | 44 | 44 |
| Accumulator-Quotient Register | AQ | 72 | 1 | 44 | 45 |
| Exponent-Accumulator-Quotient | EAQ | 80 | 1 | 44 | 46 |
| Quotient Register | Q | 36 | 1 | 45 | 45 |
| Exponent Register | E | 8 | 1 | 46 | 46 |
| Timer Register | TR | 27 | 1 | 47 | 47 |
| Low Operand Register | LOR | 72 | 1 | 54 | 55 |
| General Index Registers | GXn | 36 | 8 | 56 | 63 |
| Address Registers | ARn | 24/36 | 8 | 64 | 71 |

FIGS. 11–14 are flowcharts that illustrate an alternate embodiment of the present invention. In this alternate embodiment, an unset valid flag 292 directs the processor to load the corresponding register value directly from the Stack Frame 298, rather than from a Safe Store Buffer 286

FIG. 11 is a flowchart illustrating operation of an ICLIMB instruction, in accordance with an alternate embodiment of the present invention. The ICLIMB instruction starts by entering a loop. For each of the optional registers, its valid flag is tested, step 310. If the valid flag is set, step 312, the corresponding register is stored into the stack frame 298, step 315. Similarly, the register is stored in the stack frame 298, step 315,when the register is a "mandatory" register, such as the program counter (PC). Otherwise, if the register valid flag 292 is not set, step 312, the stack frame 298 already contains the correct register value, and the storing of the register into the stack frame 298, step 315, can be skipped. This saves the cycle that would otherwise be utilized for this step. However, in situations where the routine called by the ICLIMB instruction requires a valid copy of any given register upon entry, then the register is loaded from the stack frame, step 314. Often only a few, if any of the registers need to contain valid contents upon entry into the routine entered by the ICLIMB instruction in any given situation. For example, in the case of responding to external interrupts, the register contents from the program being interrupted are irrelevant to the interrupt processing routine. Similarly, for requests to the operating system by a user program, at most only a couple of registers need to contain valid contents upon entry: typically registers containing parameters for the operating system routine being invoked. In those cases where the contents of a register being processed need not be valid in the ICLIMB destination routine, any registers with their corresponding valid flag cleared, step 312, the register loading from the stack frame in step 314 can be suppressed, saving the corresponding memory cycles.

A test is then made whether any more registers need to be saved, step 316. If more registers need to be saved, step 316, the loop is repeated, starting at the testing of the register valid flag, step 310. Otherwise, when all registers have been stored in the stack frame 298, the stack frame 298 is pushed out to memory 24, and the stack frame register adjusted, step 318. At this point, the stack frame 298 will typically only be pushed as far as the local (L1) cache 256. However, it may ultimately be pushed into the shared (L2) cache 94, or even an MMU 84 before being reloaded by the corresponding OCLIMB instruction. Finally, the environment is appropriately modified and control is transferred to the designated location in the new environment. This modification includes incrementing the stack pointer register by the size of the stack frame 298 just pushed out to memory, step 318, in order to point at a fresh stack frame 298.

FIG. 12 is a flowchart illustrating operation of an OCLIMB instruction, in accordance with an alternate embodiment of the present invention. The OCLIMB instruction is utilized to transfer control from a higher security environment, such as the operating system, to a lower security environment, such as a user program. It is primarily utilized to return from a previous call to ICLIMB (see FIG. 11).

The OCLIMB starts by loading all remaining unloaded optional registers, as indicated by their corresponding valid flag 292 being clear, from the current stack frame 298, step 300. The OCLIMB instruction then decrements a stack buffer frame register which addresses the base of the current stack frame 298 to point at the previous stack frame, step 302. After the stack frame buffer frame register has been adjusted (i.e. decremented) to address the previous stack frame 298 as the current stack frame, step 302, mandatory registers are automatically loaded from the current stack frame 298 in memory, step 304. The other, "optional", registers, may, or may not be accessed during program execution. Loading of these optional registers is delayed until referenced (see FIG. 14). Instead, a valid flag 292 is cleared for each optional register, step 306. Then, the system environment is adjusted as required, step 308, and the instruction transfers control to the address loaded in the Instruction Counter (IC) register. A background process is then started to load the optional registers from the current stack frame 298 utilizing spare memory cycles, step 309. These loads will preferably not stall the processor 92 should it be necessary to load these registers from either shared (L2) cache 94 or shared memory 84. As these optional registers are loaded in the background, step 309, their corresponding valid flag 292 is set. It should be noted that registers necessary to maintain security, such as segment descriptor registers, should be considered "mandatory" registers in the context of the OCLIMB instruction so as not to allow modification of these registers through modification of the stack frame 298.

Figure 13:
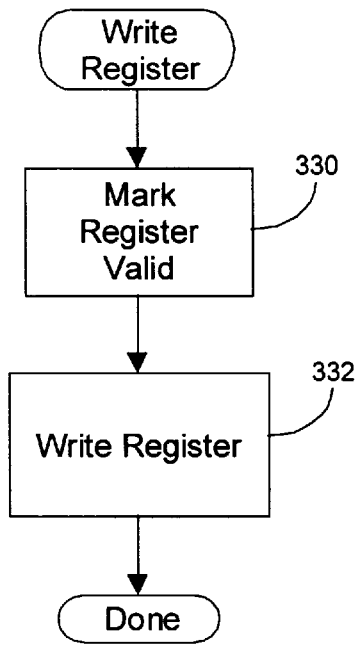
FIG. 13 is a flowchart illustrating writing a register, in accordance with an alternate embodiment of the present invention.

FIG. 13 is a flowchart illustrating writing a register, in accordance with an alternate embodiment of the present invention. This happens whenever a register is updated, whether as a result of some operation, or as a result of loading a value from memory into the register. In any case, if the register is an optional register, the corresponding register valid flag 292 is set, step 330, indicating that the register contains a valid value. The register is written or updated, step 332, and the operation is complete.

Figure 14:
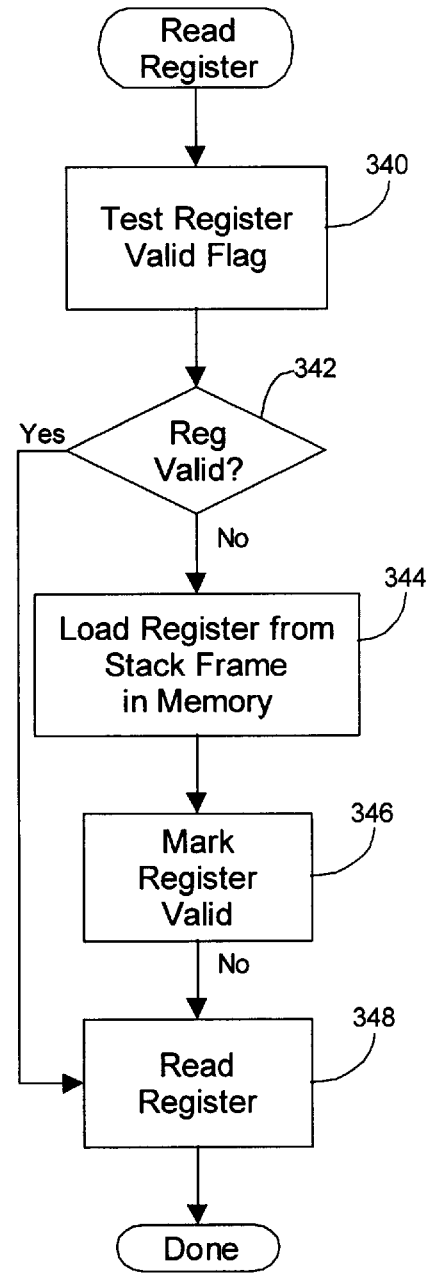
FIG. 14 is a flowchart illustrating reading a register, in accordance with an alternate embodiment of the present invention.

FIG. 14 is a flowchart illustrating reading a register, in accordance with an alternate embodiment of the present invention. In the case of optional registers, the corresponding register valid flag 292 is tested, step 340. If the register valid flag 292 is set, the register already contains a valid value. Otherwise, if the register valid flag 292 is not set, step 342, the register is loaded from the current stack frame 298, step 344, and the register valid flag 292 is set, step 346. In any case, the register is then read, step 348, and the register value is made available.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method in a data processing system of restoring a register having a previous contents saved in a memory utilizing a register valid flag corresponding to the register and having a first logical state and a second logical state, said method comprising:

A) setting the register valid flag to the first logical state when preforming processor context switch; and B) when responding to a requirement by a functional unit to read the register in response to execution of an instruction explicitly referencing the register for a current contents of the resister, performing substeps of:

1) testing whether the register valid flag is in the first logical state or the second logical state, 2) if the register valid flag is in the first logical state, a) loading the previous contents into the register as the current contents of the register, and
b) setting the register valid flag to the second logical state, and
3) providing the current contents of the register to the functional unit.

2. The method in claim 1 wherein:
said method further comprises:
C) loading the previous contents of the register into a save store buffer, and
substep (2) of step (B) further comprises:
c) providing the previous contents of the register from the save store buffer for loading in subsubstep (a).

3. The method in claim 2 wherein:
the previous contents of the register are stored in a stack in the memory.

4. The method in claim 2 wherein:
step (A) is executed during execution of a CLIMB instruction.

5. The method in claim 2 wherein:
step (A) is executed when returning from servicing an interrupt.

6. The method in claim 1 which further comprises:
C) when responding to a requirement to load a new value into the register, performing substeps of:
1) setting the register valid flag to the second logical state when the register valid flag is in the first logical state, and
2) loading the new value into the register as the current contents of the register.

7. The method in claim 6 wherein step (C) further comprises:
3) registering the current contents of the register in a save store buffer at least one half cycle after a corresponding substep (2) of step (C).

8. The method in claim 1 which further comprises:
C) loading the previous contents of the register into the register and setting the register valid flag to the second logical state during a background operation that loads registers utilizing otherwise wasted processor cycles.

9. The method in claim 1 wherein:
the previous contents of the register are stored in a stack in the memory.

10. The method in claim 1 wherein:
the register is one of a plurality of registers stored together in a stack in the memory;
each of the plurality of registers has a corresponding register valid flag having the first logical state and the second logical state; and
whenever contents of any one of the plurality of registers is required during execution of the data processing system, the corresponding register valid flag is tested and if the corresponding register valid flag is in the first logical state, the one of the plurality of registers is loaded with the previous contents for that one of the plurality of registers from the stack in the memory.

11. A processor in a data processing system, wherein said processor comprises:
a register;
a register valid flag corresponding to the register having a first logical state and a second logical state;
a memory containing a previous contents of the register;
a means for setting the register valid flag to the first logical state when performing a processor context switch;
a means for writing a value into the register that comprises:
a means for setting the corresponding register valid flag to the second logical state; and
a means for registering the value in the register;
a means for reading a current contents of the register that comprises:
a means for testing the corresponding register valid flag, and
a means for providing the previous contents of the register to the means for writing the previous contents into the register; and
a means for loading the previous contents of the register from the memory for writing into the register;
wherein:
during a processor environment transition the register valid flag is set to the first logical value; and
the previous contents of the register are loaded into the register as the current contents of the register when the corresponding register valid flag is in the first logical state and the register is read by a functional unit in response to execution of an instruction explicitly referencing the register for the current contents of the register.

12. The data processing system in claim 11 wherein:
the data processing system further comprises:
a save store buffer;
a means for loading the previous contents of the register into the save store buffer when performing the processor context switch.

13. The data processing system in claim 12 wherein:
the previous contents of the register are stored in a stack in the memory.

14. The data processing system in claim 12 wherein:
the processor context switch is in response to executing a CLIMB instruction.

15. The data processing system in claim 12 wherein:
the processor context switch is in response to returning from processing an interrupt.

16. The data processing system in claim 12 wherein:
the save store buffer registers changes to the register.

17. The data processing system in claim 16 wherein:
the save store buffer registers changes to the register at least one half cycle after the register is written.

18. The data processing system in claim 12 which further comprises:
a means for loading the previous contents of the register into the register as the current contents of the register and for setting the register valid flag to the second logical level during a background operation that loads registers utilizing otherwise wasted processor cycles.

19. The data processing system in claim 11 wherein:
the previous contents of the register are stored in a stack in the memory.

20. A processor in a data processing system, wherein said processor comprises:
a register;
a register valid flag corresponding to the register having a first logical state and a second logical state;
a safe store buffer;
a memory containing a previous contents of the register;
a means for setting the register valid flag to the first logical state when performing a processor context switch from a higher privileged environment to a lower privileged environment;

a means for loading the previous contents of the register from the memory into the safe store buffer when performing the processor context switch from the higher privileged environment to the lower privileged environment;

a means for writing a value into the register in response to a request by a functional unit that comprises:
   a means for setting the corresponding register valid flag to the second logical state;
   a means for registering the value in the register;

a means for reading a contents of the register in response to a request by a functional unit executing an instruction explicitly referencing the register for the current contents of the register that comprises:
   a means for testing the corresponding register valid flag,
   a means for providing the previous contents of the register from the safe store buffer for writing the previous contents of the register into the register as the current contents of the register when the corresponding register valid flag is in the first logical state, and
   a means for setting the register valid flag to the second logical state when the register valid flag is in the first logical state; and a means for loading the previous contents of the register from the memory for writing into the register.

* * * * *